(12) United States Patent
Juzak et al.

(10) Patent No.: US 11,992,714 B2
(45) Date of Patent: May 28, 2024

(54) FIRESTOP DEVICE INCLUDING AN EXPANDABLE FOLD-OUT COLLAR

(71) Applicant: J. VAN WALRAVEN HOLDING B.V., Mijdrecht (NL)

(72) Inventors: Marek Juzak, Mijdrecht (NL); Frank Nijdam, Zeewolde (NL)

(73) Assignee: J. VAN WALRAVEN HOLDING B.V., Mijdrecht (NL)

( * ) Notice: Subject to any disclaimer, the term of this patent is extended or adjusted under 35 U.S.C. 154(b) by 374 days.

(21) Appl. No.: 17/426,833

(22) PCT Filed: Feb. 14, 2020

(86) PCT No.: PCT/NL2020/050085
§ 371 (c)(1),
(2) Date: Jul. 29, 2021

(87) PCT Pub. No.: WO2020/167127
PCT Pub. Date: Aug. 20, 2020

(65) Prior Publication Data
US 2022/0118296 A1    Apr. 21, 2022

(30) Foreign Application Priority Data
Feb. 15, 2019 (NL) ...................................... 2022587

(51) Int. Cl.
*A62C 2/12* (2006.01)
*F16L 5/04* (2006.01)

(52) U.S. Cl.
CPC . *A62C 2/12* (2013.01); *F16L 5/04* (2013.01)

(58) Field of Classification Search
CPC ... A62C 2/12; A62C 2/065; A62C 3/16; F16L 5/04; H02G 3/22; H02G 3/0412; E04B 1/948; E04B 1/947
See application file for complete search history.

(56) References Cited

U.S. PATENT DOCUMENTS

| | | | | |
|---|---|---|---|---|
| 1,555,480 A | * | 9/1925 | Olcott | ........................ F16L 5/00 |
| | | | | 126/317 |
| 1,678,388 A | * | 7/1928 | Holden | ..................... F16L 5/00 |
| | | | | 267/158 |

(Continued)

FOREIGN PATENT DOCUMENTS

| | | |
|---|---|---|
| DE | 202006008496 U1 | 11/2006 |
| DE | 202007000727 U1 | 4/2007 |

(Continued)

OTHER PUBLICATIONS

Chinese Office Action issued in corresponding Application Serial No. CN202080014483.4 dated Jun. 17, 2022, pp. 1-4.

(Continued)

*Primary Examiner* — Gisele D Ford
(74) *Attorney, Agent, or Firm* — Tutunjian & Bitetto, P.C.

(57) ABSTRACT

A firestop device includes a collar to be mounted to a surface at wall penetration of a plastic pipe. The collar includes a first collar half and a second collar half, having corresponding end portions which are connected to each other. A fire resistant foldable cap is circumferentially connected to the collar for closing off the penetration location when the pipe is collapsed. In case of a fire an actuation assembly moves the fire resistant foldable cap over the penetration location to close it off. The collar is a fold-out collar in which said corresponding ends of the first and second collar halves are hingedly connected to each other to be moveable from a folded state, in which the second collar half substantially overlaps the first collar half, to a folded out state, in which the first collar half and the second collar half form a ring shaped collar.

29 Claims, 5 Drawing Sheets

(56) References Cited

U.S. PATENT DOCUMENTS

| | | | |
|---|---|---|---|
| 3,462,890 A | | 8/1969 | Blumenkranz et al. |
| 3,678,634 A | | 7/1972 | Wise et al. |
| 4,951,442 A | | 8/1990 | Harbeke, Jr. |
| 5,103,609 A | * | 4/1992 | Thoreson ............... A62C 2/065 |
| | | | 52/232 |
| 5,253,455 A | | 10/1993 | Cross |
| 5,331,946 A | | 7/1994 | Yamini et al. |
| 5,421,127 A | | 6/1995 | Stefely |
| 5,504,973 A | * | 4/1996 | Kameyama ............. H02G 3/22 |
| | | | 174/153 G |
| 5,887,396 A | * | 3/1999 | Thoreson ............... A62C 2/065 |
| | | | 52/220.8 |
| 6,176,052 B1 | * | 1/2001 | Takahashi .................. F16L 5/04 |
| | | | 52/220.8 |
| 6,725,615 B1 | * | 4/2004 | Porter ....................... F16L 5/04 |
| | | | 52/99 |
| 7,373,761 B2 | * | 5/2008 | Stahl, Sr. ................. A62C 3/16 |
| | | | 52/220.8 |
| 7,596,914 B2 | * | 10/2009 | Stahl, Sr. .................. F16L 5/04 |
| | | | 52/220.8 |
| 8,336,832 B2 | * | 12/2012 | van Walraven ........... F16L 5/04 |
| | | | 52/220.8 |
| 8,465,024 B2 | * | 6/2013 | Bouwman ................ F16J 15/14 |
| | | | 277/606 |
| 8,689,503 B2 | * | 4/2014 | Fischer ..................... F16L 5/14 |
| | | | 52/220.8 |
| 8,916,777 B2 | * | 12/2014 | Waterland, III ..... H02G 3/0493 |
| | | | 174/152 G |
| 9,861,843 B2 | * | 1/2018 | Paetow .................. A62C 2/065 |
| 11,476,652 B2 | * | 10/2022 | Simon ...................... H02G 3/22 |
| 11,661,735 B2 | * | 5/2023 | Cosley ...................... F16L 5/04 |
| | | | 52/232 |
| 2007/0114791 A1 | * | 5/2007 | Williams .................. F16L 5/04 |
| | | | 285/142.1 |
| 2007/0151183 A1 | | 7/2007 | Stahl, Sr. et al. |
| 2008/0128998 A1 | * | 6/2008 | Klein ....................... H02G 3/22 |
| | | | 277/604 |
| 2012/0012347 A1 | * | 1/2012 | Zernach ............... H02G 3/0412 |
| | | | 169/48 |
| 2014/0260015 A1 | * | 9/2014 | McConnell ............. E04B 1/948 |
| | | | 277/626 |
| 2014/0325933 A1 | * | 11/2014 | Marcigot ................. F16L 5/00 |
| | | | 52/741.1 |
| 2015/0053476 A1 | * | 2/2015 | Smith ....................... H02G 3/22 |
| | | | 174/660 |
| 2016/0153589 A1 | * | 6/2016 | Schwinning ............. H02G 3/22 |
| | | | 52/220.8 |
| 2016/0180988 A1 | * | 6/2016 | Klein ....................... H02G 3/22 |
| | | | 174/153 G |
| 2020/0251893 A1 | * | 8/2020 | Beele ........................ F16L 5/08 |

FOREIGN PATENT DOCUMENTS

| | | |
|---|---|---|
| EP | 0486299 A1 | 5/1992 |
| EP | 0982522 A2 | 3/2000 |
| EP | 1374953 A1 | 1/2004 |
| EP | 2372207 B1 | 4/2013 |
| GB | 2399497 A | 9/2004 |
| WO | 9119127 A2 | 12/1991 |
| WO | 00/68608 A1 | 11/2000 |
| WO | 2006034534 A1 | 4/2006 |
| WO | 2016/010420 A1 | 1/2016 |

OTHER PUBLICATIONS

International Search Report for PCT/NL2020/050085 dated Apr. 24, 2020 (3 pgs).

Written Opinion for PCT/NL2020/050085 dated Apr. 24, 2020 (7 pgs).

* cited by examiner

FIRESTOP DEVICE INCLUDING AN EXPANDABLE FOLD-OUT COLLAR

BACKGROUND

Technical Field

The present invention relates to a firestop device for closing off a location where a pipe penetrates a partition such as a wall or a ceiling. In case of a fire the firestop device closes the penetration location to prevent the spreading of fire and smoke through the partition form one space to another space.

Description of Related Art

In the field of firestop devices a variety of solutions is known to prevent fire and smoke from spreading through a wall penetration of a pipe.

One well-known solution in general comprises a substantially cylindrical sleeve, which on an inner side is provided with a layer or elements of intumescent material. The sleeve is arranged in the passage around a pipe or other duct. In case of fire the intumescent material will eventually swell due to the heat and the passage around the pipe will be sealed. In case of a plastic pipe, the pipe will soften, melt or burn by the heat and the pressure of the swelling intumescent material will make the pipe collapse, whereby the passage and pipe are sealed for fire and smoke. Examples of such firestop sleeves are disclosed in GB2111624, DE 202007000727 U1, DE 202006008496 U1, EP1374953 A1 and WO 2016/010420 A1. A disadvantage of such firestop sleeves is that they have to be arranged around the pipe and placed in in the wall penetration passage, which is not always possible in existing buildings.

Another well-known solution, which is more suitable for retrofitting in existing buildings, comprise a so called firestop collar. Such a firestop collar has in general a metal outer casing and an intumescent layer arranged on the inner side of the casing. The collar can be arranged around the circumference of a pipe and is then arranged against the surface of the partition at the pipe penetration. In case of a fire the intumescent material swells and the sturdy metal casing causes that the intumescent material creates an inwardly directed compression force that makes, in case of a plastic pipe, the pipe to collapse. Examples of such firestop collars are disclosed in EP 2372207 A1, WO 00/68608 A1, EP 0982522 A2, EP 0486299 A1, U.S. Pat. No. 4,951,442 and US 2007/151183 A1.

Another firestop device, without intumescent material, is for example disclosed in U.S. Pat. No. 5,253,455. This device has a spring loaded closure lid that rests in an open state against the outer pipe surface. When the pipe is softened by the heat of the fire it collapses under pressure of the spring loaded lid and the lid moves to a closed position to close the passage. Yet another firestop device is known from U.S. Pat. No. 5,421,127. This device comprises a collar to be mounted to a wall or ceiling and around a plastic pipe extending through a passage in the wall or ceiling. A fabric type, flexible, tubular fire retardant sleeve is attached to the collar and encircles a length of the pipe. The sleeve may be made of ceramic fibre capable of withstanding temperatures which would normally destroy the plastic pipe. A lever with weighted roller is pivotally attached adjacent the collar. The weighted roller rests against the fabric type sleeve, which is supported by the pipe from the inside. When the pipe melts, the weight of the roller provides a gravity activation of the lever which swivels towards a counter surface. The sleeve collapses between the weighted roller and the counter surface whereby the passage is closed by the fire retardant sleeve. Instead of a gravity activated mass also a spring activated mechanism is proposed. If necessary and for increased protection a fire retardant intumescent caulking may be disposed between the plastic pipe and the surrounding passage surface in the wall or ceiling.

SUMMARY OF THE INVENTION

A first aspect of the invention relates to a firestop device comprising a collar and a fire resistant foldable cap.

An object of the first aspect of the invention is to provide a firestop device which can be easily retrofitted at a pipe penetration through a partition wall or ceiling.

This object is achieved by a firestop device comprising:
   a collar to be mounted to a partition surface at a location where a plastic pipe or other non-fire resistant duct penetrates the partition, the collar including a first collar half and a second collar half, the first collar half and the second collar half having corresponding end portions which are connected to each other;
   a fire resistant foldable cap circumferentially connected to the collar and for closing off the penetration location when the pipe or duct is collapsed or destroyed by the fire; and
   an actuation assembly for moving the fire resistant foldable cap over the penetration location to close it off.

The collar is a fold-out collar in which said corresponding ends of the first and second collar halves are hingedly connected to each other so as to be moveable from a folded state, in which the second collar half substantially overlaps the first collar half, to a folded out state, in which the first collar half and the second collar half form a ring shaped collar. The first collar half is adapted to be mounted to the partition surface. The fire resistant foldable cap is attached to the first collar half and the second collar half. The actuation assembly includes the second collar half, said second collar half pulling the fire resistant foldable cap over the penetration location when moving from the folded state to the folded out state.

The firestop device according to this aspect of the invention is easy to mount against a wall or ceiling in the folded state wherein the first and second collar halves are arranged on one side of the non-fire resistant pipe or duct that passes through the wall or ceiling. This makes it possible to easily retrofit the device at an existing pipe, even when one side of the pipe is difficult to reach, e.g. by the presence of a wall or other objects, such as other pipes, relatively close to the pipe to be protected. The first collar half is fixed to the wall or ceiling. The second collar half rests against an outer surface of the pipe and is blocked thereby. The foldable cap is arranged in a collapsed state between the first collar half and the second collar half. In case of a fire, the pipe is destroyed or collapses and the second collar half is able to cross over towards the other side of the penetration location. Thereby the collar expands and the fire resistant foldable cap is folded out over the penetration location. The foldable cap prevents debris or glowing material from passing through the passage in the wall where the pipe used to be.

In a particularly preferred embodiment an element comprising intumescent material is arranged on an inner side of the first collar half and the second collar half. In case of a fire the intumescent material swells and creates a radial pressure on the heated pipe which collapses, thereby closing the passage. The foldable cap which is folded out over the passage prevents the intumescent from falling down, especially if the penetration location of the pipe is located in a ceiling.

In a further preferred embodiment the foldable cap is made of a fire resistant fabric. Fire resistant fabric is readily available and due to its general properties is a convenient material to make the foldable cap of. These properties are that it is a foldable material is, which is easily attachable to the collar halves, and able to withstand high temperatures.

In a further preferred embodiment, the fabric foldable cap is arranged on the first and second collar halves, such that in the folded out state the foldable cap is stretched tightly over the penetration location. Thereby, when the collar with the foldable cap is expanded, the stretched fabric provides a sturdy support surface against which the swelling intumescent can expand and is kept in place. As a result the expanded intumescent can remain in and in front of the penetration passage, which thereby can remain sealed for fire and smoke.

In a possible embodiment the actuation assembly furthermore comprises an actuator arranged and configured to move the second collar half from the folded state to the folded out state. Preferably the actuator comprises a spring, which is at least pretensioned in the folded state of the collar. The spring makes that the device can function independent of gravity. Moreover the spring maintains the expanded collar with the folded out foldable cap in the expanded position.

In a possible embodiment the device may furthermore comprise a locking mechanism to lock the second collar half in the folded out state. This makes the functioning of the device more secure, should for example due to the harsh conditions during a fire the actuator fail after a while and not be able anymore to maintain the device in the folded out state.

The locking mechanism may comprise a ratchet mechanism associated with the first and second collar halves, wherein the ratchet mechanism allows the second collar half to move from the folded to the folded out state, but blocks a movement in the opposite direction.

A second aspect of the invention is based on the insight that a firestop collar having intumescent material on the inside of the collar may be constructed as a fold out collar as described in the above, independent from the presence of a fire resistant fabric element.

In particular the invention according to the second aspect relates to a firestop device comprising a collar to be mounted to a partition surface at a location where a plastic pipe or another non-fire resistant duct penetrates the partition, wherein the collar has an inner side on which an intumescent material is arranged, wherein:
- the collar is a fold-out collar including a first collar half and a second collar half,
- the first collar half and the second collar half each comprise a semi-cylindrical wall and a radial flange for abutting the wall surface, wherein the semi-cylindrical wall has a radial inner side on which the intumescent material is arranged,
- the first collar half is adapted to be mounted to the partition surface with its radial flange secured in abutment with the partition surface,
- the first collar half and the second collar half having corresponding end portions which are hingedly connected to each other, such that the collar halves are moveable from a folded state, in which the second collar half substantially overlaps the first collar half, to a folded out state, in which the first collar half and the second collar half form a ring shaped collar,
- the device furthermore comprises an actuator arranged and configured to move the second collar half from the folded state to the folded out state.

The fire collar according to the second aspect of the invention has the advantage that it is more easily retrofitted than collars that are from the beginning surrounding the pipe. This may in particular be advantageous when there is limited access to one side of the pipe to be protected, for example due to the presence of other objects, such as nearby walls or ducts. In that case the present fold-out collar provides an easy to install solution, which becomes a circular firestop collar when the pipe collapses due to the fire and the second collar halve moves over the penetration passage in the partition.

In a preferred embodiment of the firestop device according to the second aspect of the invention, a fire resistant foldable cap is attached to the first and second collar half. The fire resistant foldable cap is arranged in a collapsed state between the first collar half and the second collar half. In case of a fire, the pipe is destroyed or collapses and the second collar half is able to swivel over towards the other side of the penetration location, thereby folding out the fire resistant foldable cap over the face of the penetration passage. In case of a fire the intumescent material swells and creates a radial pressure on the heated pipe which collapses thereby closing the penetration passage. The fire resistant foldable cap, which is folded out over the penetration passage, prevents the intumescent from falling down, especially if the passage is located in a ceiling.

In a possible embodiment the device furthermore comprises an actuator arranged and configured to move the second collar half from the folded state to the folded out state. Preferably the actuator comprises a spring, which is at least pretensioned in the folded state of the collar.

In a possible embodiment the device furthermore comprises a locking mechanism to lock the second collar half in the unfolded state. This makes the functioning of the device more secure, should for example due to the harsh conditions during a fire the actuator fail after a while and not be able anymore to maintain the device in the folded out state. The locking mechanism may for example comprise a ratchet mechanism as is described in the above in relation to the first aspect of the invention.

Preferably the foldable cap in both aspects of the invention is made of a fire resistant fabric. However, it is also conceivable to make the foldable cap of material or elements which are fire resistant and can be brought to a collapsed state between the collar halves in the folded state of the collar. One could think for example of a cap made of a fire resistant plastic material. Another example would be a foldable cap made of a wire mesh, for example a metal wire mesh. Yet another embodiment could be a foldable cap of slideable lamellar slats made of a fire resistant material, for example metal.

A third aspect of the invention relates to a firestop device comprising:
- a collar to be mounted to a partition surface at a location where a plastic pipe or other non-fire resistant duct penetrates the partition, the collar including a first collar half and a second collar half, the first collar half and the second collar half having corresponding end portions which are connected to each other;
- a fire resistant extendable and collapsible cap circumferentially connected to the collar and for closing off the penetration location when the pipe or duct is collapsed or destroyed by the fire; and an actuation assembly for moving the fire resistant cap from a collapsed state to an extended state over the penetration location to close it off.

The collar according to the third aspect is a fold-out collar in which said corresponding ends of the first and second collar halves are hingedly connected to each other so as to be moveable from a folded state, in which the second collar half substantially overlaps the first collar half, to a folded out state, in which the first collar half and the second collar half form a ring shaped collar, wherein the first collar half is adapted to be mounted to the partition surface, wherein the fire resistant cap is attached to the first collar half and the second collar half, and wherein the actuation assembly includes the second collar half, said second collar half pulling the fire resistant cap from its collapsed state to its extended state over the penetration location when moving from the folded state to the folded out state.

In a possible embodiment according to the third aspect of the invention the fire resistant cap is made of a foldable material. The foldable material may be a fire resistant fabric, a metal wire mesh, or a sheet of a fire resistant plastic material. In particular fire resistant fabric is readily available and due to its general properties is a convenient material to make the foldable cap of. These properties are that fire resistant fabric is a foldable material is, which is easily attachable to the collar halves, and able to withstand high temperatures.

In another possible embodiment according to the third aspect of the invention the fire resistant cap comprises mutually moveable, preferably mutually slideable, lamellar slats made of fire resistant material. The lamellar slats may be made of metal.

The lamellar slats may be form-stable and in the collapsed state of the cap the lamellar slats may have an overlapping configuration, in which the slats overlap each other at least partly, and wherein in the extended state of the cap the lamellar slats form a surface to cover the penetration passage. The lamellar slats are thus moved from the overlapping configuration to a configuration in which they cover a larger area so as to cover the penetration passage.

Also in the firestop device according to the third aspect of the invention an element comprising intumescent material may be arranged on an inner side of the first collar half and the second collar half. In case of a fire the intumescent material swells and creates a radial pressure on the heated pipe which collapses, thereby closing the passage. The cap which is folded out over the passage prevents the intumescent from falling down, especially if the penetration location of the pipe is located in a ceiling.

In the firestop device according to the third aspect of the invention the actuation assembly furthermore may comprise an actuator arranged and configured to move the second collar half from the folded state to the folded out state. The actuator may comprise a spring, which is at least pretensioned in the folded state of the collar. The spring makes that the device can function independent of gravity. Moreover the spring maintains the expanded collar with the folded out foldable cap in the expanded position.

In the firestop device according to the third aspect of the invention the device may furthermore comprise a locking mechanism to lock the second collar half in the folded out state. This makes the functioning of the device more secure, should for example due to the harsh conditions during a fire the actuator fail after a while and not be able anymore to maintain the device in the folded out state. The locking mechanism may comprise a ratchet mechanism associated with the first and second collar halves, wherein the ratchet mechanism allows the second collar half to move from the folded to the folded out state, but blocks a movement in the opposite direction.

BRIEF DESCRIPTION OF THE DRAWINGS

The invention will be further elucidated in the following detailed description with reference to the drawings.

DETAILED DESCRIPTION

Figure 4:
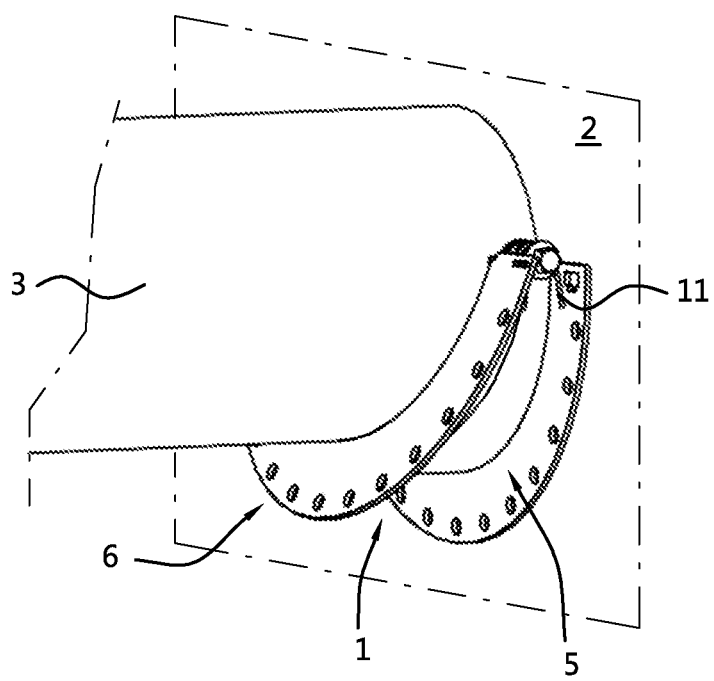
FIG. 4 shows an isometric view of an embodiment of a fire protection device including a collar of FIG. 1 and a fire resistant fabric element in a folded state mounted at a wall penetration of a pipe.
Figure 5:
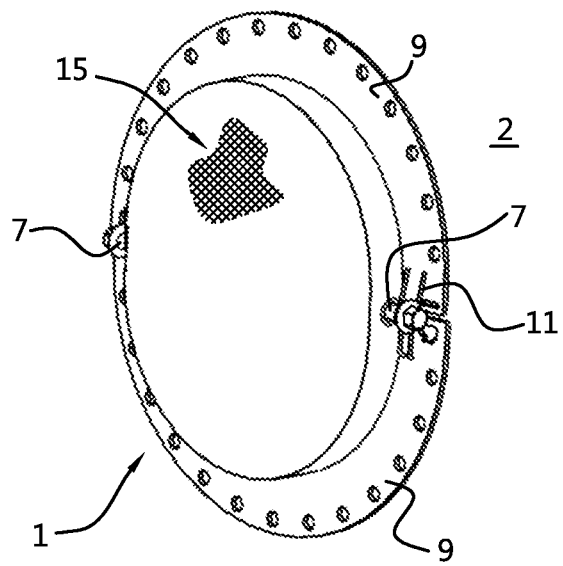
FIG. 5 shows the fire protection device of FIG. 4 in a folded out state.
Figure 6:
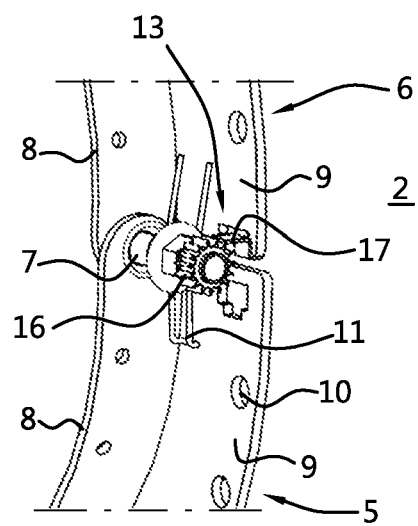
FIG. 6 shows a detail of the collar of the fire protection device of FIG. 5.

In the FIGS. 4 and 5 an embodiment of a firestop device 1 according to the invention is shown. The firestop device 1 is adapted to be mounted to the surface of a partition in a building, such as a wall or ceiling, at the location where a pipe or other duct passes through the partition. The partition surface is indicated by reference numeral 2. Typically the firestop device 1 is arranged at a pipe 3 which is made of a non-fire resistant material. In particular the firestop device 1 can be applied at a location where a plastic pipe 3, which melts or burns in a fire, penetrates a partition wall or ceiling.

The firestop device 1 in the preferred embodiment comprises a collar 4 and a fire resistant foldable cap 15 which is attached to the collar halves 5 and 6, which will be described in more detail further below.

Figure 1:
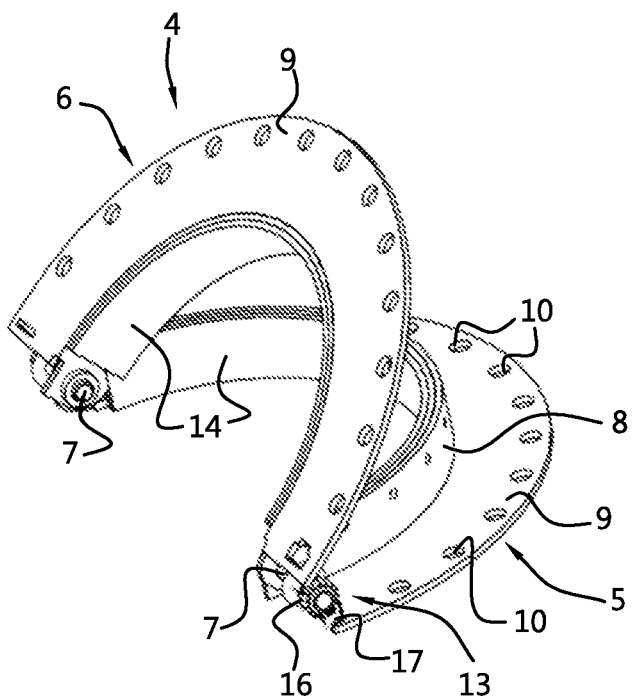
FIG. 1 shows an isometric view of a collar of an embodiment of a fire protection device according to the invention in a folded state.
Figure 2:
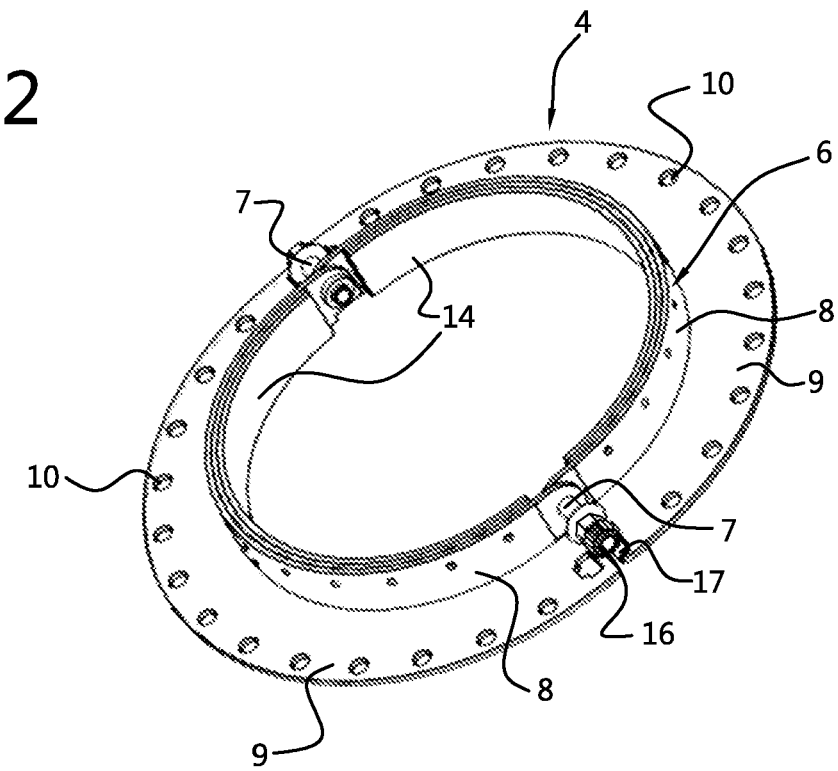
FIG. 2 shows an isometric view of the collar of FIG. 1 in a folded out state.

For clarity the collar 4 is separately shown in FIGS. 1 and 2, thus without a foldable cap 15 arranged on the collar 4. In the following the terms "folded out" or "expanded" will be used in connection with the collar 4 to describe the state which is shown in FIG. 2. The terms "folded state" or "collapsed state" in connection with the collar 4 are used to describe the state which is shown in FIG. 1.

The collar 4 includes a first collar half 5 and a second collar half 6. The first collar half 5 and the second collar half 6 have corresponding end portions which are hingedly connected to each other by means of respective hinge pins 7.

The collar halves 5 and 6 are made of fire resistant rigid material, preferably of steel or another suitable metal. The collar halves 5 and 6 are preferably the same and each comprise a collar portion 8 and a flange portion 9 which extends radially from the collar portion 8. The flange portion 9 can be fixed to a partition surface by means of fastening elements such as screws. Thereto the flange portion 9 has fastening holes 10 formed in them. In this case the fastening holes 10 are distributed over the circumference. In practise only the first collar half 5 is fixed to the partition surface 2 as will be described in more detail further below.

Figure 3:
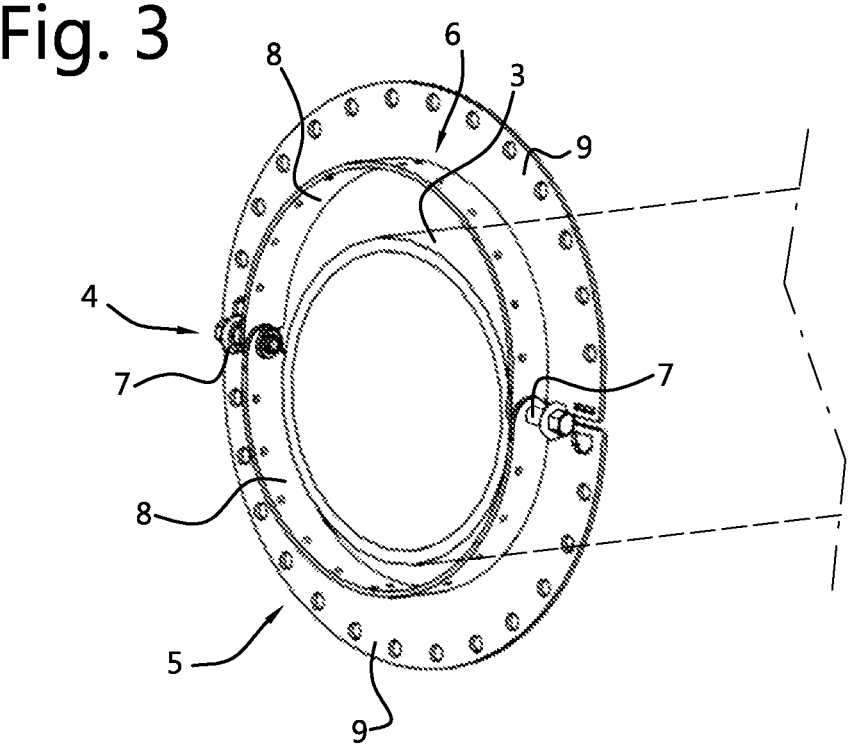
FIG. 3 shows an isometric view of the collar of FIG. 1 in a folded out state and mounted on a partition at a wall penetration of a pipe.

On the inner side of the collar portion 8 of the first collar half 5 and the second collar half 6, respective strips 14 of intumescent material are arranged as is illustrated in FIGS. 1 and 2. In FIG. 3 the collar 4 is shown in which the intumescent strips are omitted for illustrative purposes. Intumescent strips are as such known and comprises generally a graphite and aluminium-flake compound which swells when it is exposed to extreme heat which occurs during a fire.

The collar 4 has a folded state or collapsed state, which is shown in FIG. 1. In the folded state the first collar half 5 and the second collar half 6 are brought towards each other; the second collar half 6 overlies the first collar half 5 in this state as it were. The collar 4 is arranged in this folded state around a pipe 3 that extends from the partition 2 as is shown in FIG. 4. The first collar half 5 is anchored to the partition surface 2 by means of screws or other suitable fastening means. The second collar half 6 is located on the same side of the pipe 3 and engages the pipe 3 as is illustrated in FIG. 4.

A spring 11 is arranged between the first and second collar halves 5, 6. In the shown example of FIGS. 4 and 5 the spring 11 is a torsion spring, for example a helical torsion spring, comparable to a spring that is used in a clothes peg or in a mouse trap. It is noted that the spring is omitted in the FIGS. 1-3. The spring 11 is arranged coaxially around one of the hinge pins 7. Preferably on both sides, thus around both of the hinge pins 7, a spring 11 is arranged. In the folded state, shown in FIG. 4, the spring 11 is tensioned and pushes the first collar half 5 and the second collar half 6 away from each other. When the first collar half 5 and the second collar half 6 can freely move, the spring 11 will straighten the collar 4 to the expanded state which is illustrated in FIGS. 2 and 5. In the folded state as shown in FIG. 4 the spring 11 pushes the second collar half 6 in engagement with the pipe 3. In case of a fire, the heat softens or burns the pipe 3 whereby the spring actuated second collar half 6 deforms the pipe 3 such that it collapses, or just pushes through the burning pipe 3. Ultimately, the second collar half 6 will engage the partition surface 2 with its flange portion 9 as is illustrated in FIGS. 3 and 5.

Because the spring or springs 11 provide a considerable force which makes the pipe 3 collapse when it is affected by the fire, the present firestop device 1 requires less intumescent material than a more conventional firestop sleeve or firestop collar, in which the swelling intumescent material has to provide the compressive force to make the pipe collapse and close off the passage at the wall or ceiling penetration of the pipe.

The firestop device furthermore comprises a locking mechanism 13 to lock the second collar half 6 in the folded out state shown in FIGS. 2, 3 and 5. In the embodiment shown in the figures the locking mechanism 13 comprises a ratchet mechanism including a cogged element 16 associated with the second collar half 6 and a latch 17 that is associated with the first collar half 5. The cogged element 16 in this specific embodiment is a sort of pinion, but also other elements with teeth may be suitable to provide a locking effect. The latch 17 allows the cogged element 16 to move with the second collar half 6 from the folded to the folded out state, but blocks a movement in the opposite direction. Thus, even in the event that the spring action provided by the spring(s) 11 is affected by the fire, the collar will be held in the folded out state as shown in FIGS. 2, 3 and 5.

The spring 11 as described in the above is a simple and effective actuator to drive the expansion of the fold-out collar towards the folded out state, independent of the position and orientation of the collar fixed to the partition surface 2. However, there are also other actuators which might be suitable. For example one could think of pneumatic springs, hydraulic or pneumatic cylinders, or even an actuator including intumescent material which provides the driving force when it swells under the influence of heat. In some cases even a gravity driven actuator might be suitable.

The fire resistant foldable cap 15 is made of a fire resistant fabric. This fabric may be a ceramic fibre fabric. The foldable cap 15 is circumferentially attached to an outer side of the respective collar portions 8 of the first and second collar halves 5 and 6. The fabric is foldable between the collar halves 5 and 6 as is shown in FIG. 4. In case of a fire the second collar half is pushed through the weakened pipe 3 or makes the weakened pipe 3 collapse by the spring force of the spring(s) 11. The second collar half 6 pulls the initially folded fire resistant fabric element 15 over the location of the pipe penetration in the partition wall or ceiling when moving from the folded state to the folded out state. The fabric cap 15 is stretched over the folded out collar as is shown in FIG. 5. Thereby the passage through the partition is closed off by the fabric cap 15.

The fire resistant fabric cap 15 can prevent that debris or glowing material passes through the passage in the wall at the pipe penetration location. In a preferred embodiment of the firestop device 1 there is provided intumescent material on the inner side of the collar as is mentioned also in the above. The intumescent material closes off the passage through the partition wall or ceiling and prevents smoke and fire to pass through the partition wall or ceiling. The fire resistant foldable cap 15 which is stretched tightly over the passage by the collar halves 5, 6 provides a sturdy support surface for the swelling intumescent material 14 such that the swelling intumescent material is directed towards the passage to be sealed and does not fall down.

It is noted that in the embodiment shown herein the firestop device 1 includes both an intumescent layer 14 on the inner side of the collar and a fire resistant foldable cap 15.

However, it must be understood that also an embodiment of the firestop device which only has a fire resistant foldable cap 15, but in which the intumescent material is omitted falls under the scope of the claimed invention. Such an embodiment could be combined with separate intumescent strip or tape that is wrapped separately around a pipe. Such an embodiment could also be used in circumstances where for example the gap between the pipe and the passage in the wall is filled with an intumescent caulking, and an intumescent layer arranged on the inner side of the collar halves would be superfluous.

Furthermore it is noted that also an embodiment of the firestop device without the fire resistant foldable cap 15 falls within the scope of the claimed invention. In this case the collar halves 5, 6 are only provided with intumescent elements 14 on the inner side.

A firestop device 1 as described in the above conveniently comprises a fold-out collar which can be mounted on a partition where a non-fire resistant duct, such as a plastic pipe, penetrates the partition. It is in particular convenient to use this collar in situations where the pipe 3 is already installed through the partition and the firestop device has to be retrofitted. As is shown in FIG. 4 the first collar half 5 is attached to a surface 2 of the partition such that it circumvents half of the pipe 3, and the second collar half 6 is substantially overlying the first collar half 5 and circumvents the same half of the pipe 3 as the first collar half 5 and rests against an outer side of the pipe 3. The springs 11 are pretensioned in this state. In case of a fire, the heat affects the pipe 3. The tension of the spring(s) 11 provides a pressure of the second collar half 6 on the pipe 3. The pipe 3 may collapse due to this pressure and the collar half 6 moves over the passage in the wall, thereby pulling the fabric cap 15 over the passage. In the meantime the swelling intumescent provides for further collapsing of the pipe 3 and sealing of the passage in the wall.

It is noted that in the practical embodiment disclosed herein the foldable cap is preferably made of a fire resistant fabric. It must be understood though that also other materials having the property of being foldable and being fire resistant are conceivable and are deemed to be within the scope of the claimed invention. Other suitable materials are for example metal wire mesh or a sheet of a fire resistant plastic material.

Figure 7:
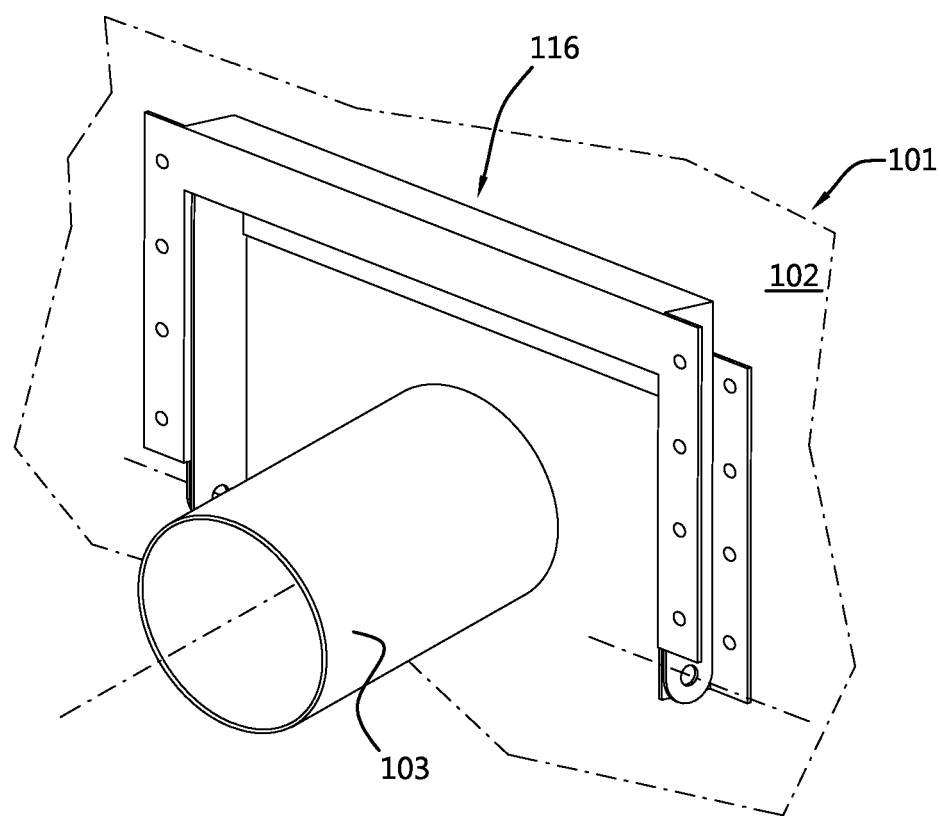
FIG. 7 shows an isometric view of another embodiment of a fire protection device in a folded state.
Figure 8:
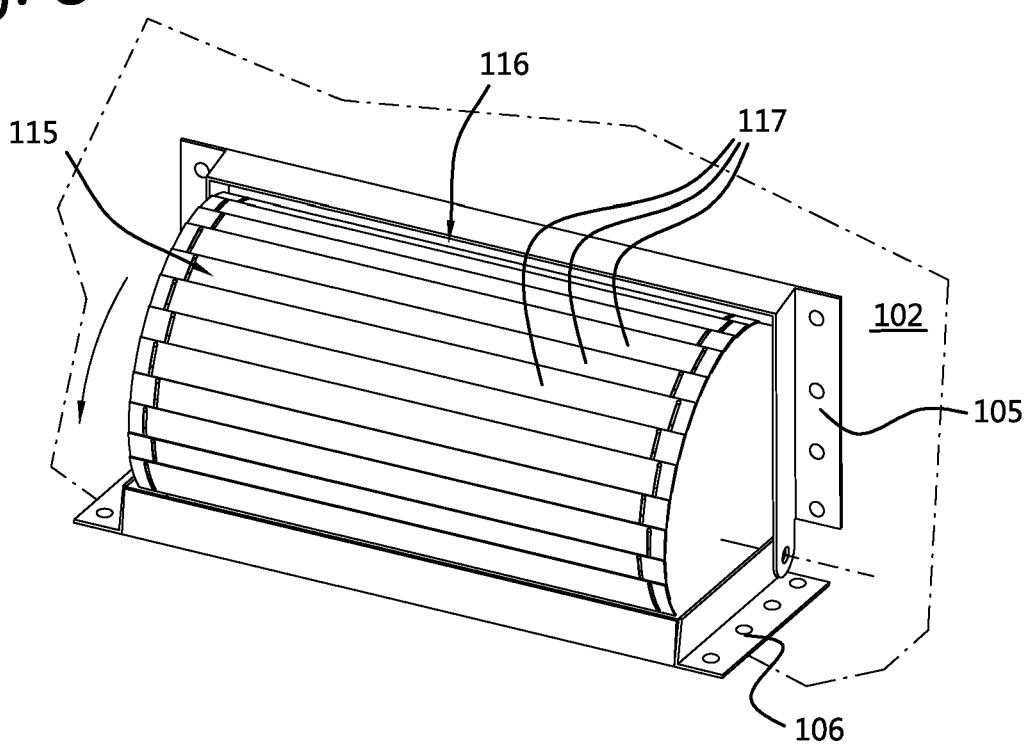
FIG. 8 shows an isometric view of the fire protection device of FIG. 7 while expanding.
Figure 9:
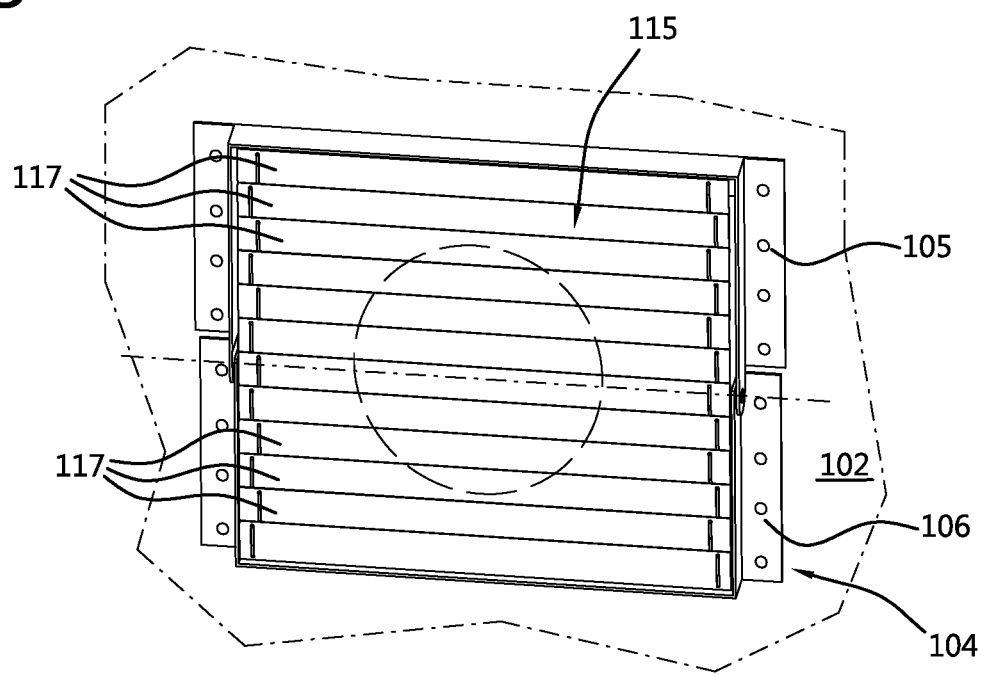
FIG. 9 shows an isometric view of the fire protection device of FIG. 7 in the folded out state.

Also foldable or collapsible structures comprising mutually slideable lamellar slats made of a fire resistant material, e.g. metal, are possible. The slideable lamellar slats can be form-stable as such and in a folded or collapsed state of the cap overlap each other at least partly. In the folded out state of the collar the slats slide out of the overlapping configuration and form a surface to cover the penetration passage. FIGS. 7-9 illustrate an example of such a firestop device having lamellar slats.

The firestop device in FIGS. 7-9 is indicated by reference numeral 101. Like firestop device 1, the firestop device 101 is adapted to be mounted to the surface of a partition in a building, such as a wall or ceiling, at the location where a pipe or other duct passes through the partition. The partition surface is indicated by reference numeral 102. Typically the firestop device 101 is arranged at a pipe 103 which is made of a non-fire resistant material. In particular the firestop device 101 can be applied at a location where a plastic pipe 103, which melts or burns in a fire, penetrates a partition wall or ceiling.

The firestop device 101 in this embodiment comprises a collar 104 and a fire resistant cap 115 which is attached to the collar halves 105 and 106. The fire resistant cap 115 comprises in a collapsed state a stack 116 of mutually slideable lamellar slats 117. In case of a fire when the pipe 103 collapses or burns, the collar halve 106 move under influence of a spring (cf. the spring 11 in FIGS. 4 and 5), from the folded to an unfolded state. Thereby the slats 117 of the cap 115 are moved (cf. FIG. 8) from a stacked and overlapping state (cf. FIG. 7) to an extended state (cf. FIG. 9) while sliding out of the overlapping configuration and form a surface to cover the penetration passage. The slideable lamellar slats 117 can be form-stable and for example be made of metal, e.g. thin sheet metal. In the extended state of the cap 115 the lamellar slats 117 form a surface to cover the penetration passage as is illustrated in FIG. 9.

The invention claimed is:

1. A firestop device comprising:
a collar to be mounted to a partition surface at a location where a plastic pipe or other non-fire resistant duct penetrates the partition, the collar including a first collar half and a second collar half, the first collar half and the second collar half having corresponding end portions which are connected to each other;
a fire resistant foldable cap circumferentially connected to the collar and for closing off the penetration location when the pipe or duct is collapsed or destroyed by the fire; and
an actuation assembly for moving the fire resistant foldable cap over the penetration location to close it off;
wherein the collar is a fold-out collar in which said corresponding ends of the first and second collar halves are hingedly connected to each other so as to be moveable from a folded state, in which the second collar half substantially overlaps the first collar half, to a folded out state, in which the first collar half and the second collar half form a ring shaped collar, wherein the first collar half is adapted to be mounted to the partition surface, wherein the fire resistant foldable cap is attached to the first collar half and the second collar half, and wherein the actuation assembly includes the second collar half, said second collar half pulling the fire resistant foldable cap over the penetration location when moving from the folded state to the folded out state.

2. The firestop device according to claim 1, wherein an element comprising intumescent material is arranged on an inner side of the first collar half and the second collar half.

3. The firestop device according to claim 1, wherein the foldable cap is made of a fire resistant fabric.

4. The firestop device according to claim 3, wherein the foldable cap is arranged on the first and second collar halves, such that in the folded out state the fire resistant foldable cap is stretched tightly over the penetration location.

5. The firestop device according to claim 1, wherein the actuation assembly furthermore comprises an actuator arranged and configured to move the second collar half from the folded state to the folded out state.

6. The firestop device according to claim 5, wherein the actuator comprises a spring, which is at least pretensioned in the folded state of the collar.

7. The firestop device according to claim 1, wherein the device furthermore comprises a locking mechanism to lock the second collar half in the folded out state.

8. The firestop mechanism according to claim 7, wherein the locking mechanism comprises a ratchet mechanism associated with the first and second collar halves, wherein the ratchet mechanism allows the second collar half to move from the folded to the folded out state, but blocks a movement in the opposite direction.

9. The firestop device comprising a collar to be mounted to a partition surface at a location where a plastic pipe or another non-fire resistant duct penetrates the partition, wherein the collar has an inner side on which an intumescent material is arranged,
wherein
the collar is a fold-out collar including a first collar half and a second collar half,
the first collar half and the second collar half each comprise a semi-cylindrical wall and a radial flange for abutting the wall surface, wherein the semi-cylindrical wall has a radial inner side on which the intumescent material is arranged,
the first collar half is adapted to be mounted to the partition surface with its radial flange secured in abutment with the partition surface,
the first collar half and the second collar half having corresponding end portions which are hingedly connected to each other, such that the collar halves are moveable from a folded state, in which the second collar half substantially overlaps the first collar half, to a folded out state, in which the first collar half and the second collar half form a ring shaped collar, the device furthermore comprises an actuator arranged and configured to move the second collar half from the folded state to the folded out state.

10. The firestop device according to claim 9, wherein a fire resistant foldable cap is attached to the first and second collar half.

11. The firestop device according to claim 10, wherein the foldable cap is made of a fire resistant fabric.

12. The firestop device according to claim 9, wherein the device furthermore comprises an actuator arranged and configured to move the second collar half from the folded state to the folded out state.

13. The firestop device according to claim 12, wherein the actuator comprises a spring, which is at least pretensioned in the folded state of the collar.

14. The firestop device according to claim 9, wherein the device furthermore comprises a locking mechanism to lock the second collar half in the unfolded state.

15. A method of installation of a firestop device comprising a fold out collar on a partition at a location where a non-fire resistant duct, such as a plastic pipe, penetrates the partition, wherein the fold-out collar comprises a first collar half and a second collar half having corresponding end portions which are hingedly connected to each other, wherein the first collar half is attached to a surface of the partition such that it circumvents half of the duct, and wherein the second collar half is substantially overlying the first collar half and circumvents the same half of the duct as the first collar half and rests against an outer side of the duct.

16. A firestop device comprising:
a collar to be mounted to a partition surface at a location where a plastic pipe or other non-fire resistant duct penetrates the partition, the collar including a first collar half and a second collar half, the first collar half and the second collar half having corresponding end portions which are connected to each other;
a fire resistant extendable and collapsible cap circumferentially connected to the collar and for closing off the penetration location when the pipe or duct is collapsed or destroyed by the fire; and
an actuation assembly for moving the fire resistant cap from a collapsed state to an extended state over the penetration location to close it off;
wherein the collar is a fold-out collar in which said corresponding ends of the first and second collar halves are hingedly connected to each other so as to be moveable from a folded state, in which the second collar half substantially overlaps the first collar half, to a folded out state, in which the first collar half and the second collar half form a ring shaped collar, wherein the first collar half is adapted to be mounted to the partition surface, wherein the fire resistant cap is attached to the first collar half and the second collar half, and wherein the actuation assembly includes the second collar half, said second collar half pulling the fire resistant cap from its collapsed state to its extended state over the penetration location when moving from the folded state to the folded out state.

17. The firestop device according to claim 16, wherein the fire resistant cap is made of a foldable material.

18. The firestop device according to claim 17, wherein the foldable material is a fire resistant fabric.

19. The firestop device according to claim 17, wherein the foldable material is a metal wire mesh.

20. The firestop device according to claim 17, wherein the foldable material is a sheet of a fire resistant plastic material.

21. The firestop device according to claim 16, wherein the fire resistant cap comprises mutually moveable, preferably mutually slideable, lamellar slats made of fire resistant material.

22. The firestop device according to claim 21, wherein the lamellar slats are made of metal.

23. The firestop device according to claim 21, wherein the lamellar slats are form-stable.

24. The firestop device according to claim 23, wherein in the collapsed state of the cap the lamellar slats have an overlapping configuration, in which the slats overlap each other at least partly, and wherein in the extended state of the cap the lamellar slats form a surface to cover the penetration passage.

25. The firestop device according to claim 16, wherein an element comprising intumescent material is arranged on an inner side of the first collar half and the second collar half.

26. The firestop device according to claim 16, wherein the actuation assembly furthermore comprises an actuator arranged and configured to move the second collar half from the folded state to the folded out state.

27. The firestop device according to claim 26, wherein the actuator comprises a spring, which is at least pretensioned in the folded state of the collar.

28. The firestop device according to claim 16, wherein the device furthermore comprises a locking mechanism to lock the second collar half in the folded out state.

29. The firestop mechanism according to claim 28, wherein the locking mechanism comprises a ratchet mechanism associated with the first and second collar halves, wherein the ratchet mechanism allows the second collar half to move from the folded to the folded out state, but blocks a movement in the opposite direction.

* * * * *